United States Patent [19]

Hartinger et al.

[11] 4,274,971
[45] Jun. 23, 1981

[54] FILTRATION PROCESS USING POLYOLEFIN FIBRIDS AS FILTER AIDS

[75] Inventors: Edmund Hartinger, Baden; Elias Jülke, Wettingen; Harald Sandmann, Nussbaumen, all of Switzerland

[73] Assignee: Maschinenfabrik Meyer AG, Switzerland

[21] Appl. No.: 141,352

[22] Filed: Apr. 18, 1980

[30] Foreign Application Priority Data

May 14, 1979 [CH] Switzerland ............... 4449/79

[51] Int. Cl.³ ................................................ B01D 37/02
[52] U.S. Cl. ............................................................ 210/778
[58] Field of Search ............ 210/39, 40, 75, 505, 210/509, 508; 162/157 R; 264/11

[56] References Cited

U.S. PATENT DOCUMENTS

| 2,999,788 | 9/1961 | Morgan | 162/157 R |
|---|---|---|---|
| 3,274,103 | 9/1966 | Adams | 210/75 |
| 3,632,415 | 1/1972 | Franklin | 210/509 |
| 3,812,973 | 5/1974 | Stern | 210/505 |
| 3,880,754 | 4/1975 | Brost | 210/75 |
| 3,961,007 | 6/1976 | Caputi | 264/11 |
| 4,104,170 | 8/1978 | Nedza | 210/505 |

FOREIGN PATENT DOCUMENTS

| 2801685 | 7/1978 | Fed. Rep. of Germany | 210/505 |
|---|---|---|---|
| 2813356 | 10/1978 | Fed. Rep. of Germany | 210/505 |
| 47-20054 | 7/1972 | Japan | 210/75 |
| 752287 | 7/1956 | United Kingdom | 210/505 |
| 1351596 | 3/1970 | United Kingdom | 210/75 |

Primary Examiner—Ernest G. Therkorn
Attorney, Agent, or Firm—Oblon, Fisher, Spivak, McClelland & Maier

[57] ABSTRACT

In a filtration process for filtering or clarifying aqueous suspensions of finely divided solid materials, a filter aid comprising polyolefin fibrids, e.g., polyethylene or polypropylene fibrids, is added to the suspension to be filtered. The filter aid comprising polyolefin fibrids which have been rendered hydrophilic may also be used to precoat a filter medium.

5 Claims, No Drawings

FILTRATION PROCESS USING POLYOLEFIN FIBRIDS AS FILTER AIDS

BACKGROUND OF THE INVENTION

1. Field of the Invention

This invention relates to a filtration process and more particularly to a process for clarifying filtration of aqueous media using filter aids added to the media to be filtered.

2. Description of the Prior Art

It is common in the filtration of industrial waste waters to use a precoated filter in which, in a preliminary step, a layer of a filter aid is deposited on a filter medium having relatively large pores, for instance a filter cloth, a filter plate, or a filter cartridge. Useful filter aids for such processes include organic materials, e.g., cellulose or synthetic fibers, and inorganic materials, e.g., kieselguhr, asbestos, bentonite, and the like. Such filter aids are commercially available, for example, under the trade names LEVASORB, AF2, SOLCA-FLOC, etc. After the filtration has been completed, the filter aid is generally burned or discarded together with the filtered solids.

This known filtering process using filter aids is expedient for the processing of normal waste water containing filterable solids, by reason of its effectiveness as well as economy. However, the known filter aids for such processes have a relatively limited efficiency, and, as a rule, tend to form a filter cake which plugs rather quickly.

Hence, a need has continued to exist for an improved filter aid which is suitable for use in filtration of industrial waste water, but does not possess the disadvantages of the known filter aids.

SUMMARY OF THE INVENTION

Accordingly, it is an object of this invention to provide new filter aids.

A further object is to provide filter aids which permit more efficient filtration processes.

A further object is to provide a more efficient process for filtration of waste water using a new filter aid.

Further objects of the invention will become apparent from the description which follows.

It has been found that so-called polyolefin fibrids, which are already known and used in making paper from synthetic fibers, and which are to some extent already commercially available, can be used as filter aids in the filtration of waste water and afford significant advantages in comparison with known filter aids. These polyolefin fibrid filter aids exhibit a high efficiency and a relatively slight tendency to clogging.

According to the invention an improved process of filtering waste water involves adding polyolefin fibrids to the waste water as a filter aid before passing the waste water through the filter medium. Hydrophilic polyolefin fibrids, especially those made from polyethylene and polypropylene, are especially useful as filter aids.

DETAILED DESCRIPTION OF THE INVENTION AND PREFERRED EMBODIMENTS

Polyolefin fibrids suitable for practicing the process of this invention are those having a mean classified fiber length (CFL) of about 0.5 to 2.5 mm and a specific surface area of about 5 to 10 m$^2$/g. Characteristic thicknesses can not, in general, be stated for fibrids, but they typically range up to about 10 micrometers. These fibrids can be prepared by various known crystallization processes, by evaporation of solutions, by extrusion, by stretching, or by crushing polyolefin fibers in refining equipment used in paper and wood technology.

It is thought that the formation of fibrids is due to crystallization phenomena and, therefore, crystallizable polyolefins are preferred for use in the process of the invention, especially those which exhibit crystallization under the application of shearing forces such as polyethylene.

Since polyolefins as such are hydrophobic, the polyolefin fibrids used for making paper are for the most part hydrophilized, for example, by treatment with hydrophilizing agents such as hydrophilic urea-formaldehyde condensation products, polyvinyl alcohol, polyethylene imine, polyvinylpyrrolidone, polyacrylamide, carboxymethylcellulose, sodium acrylate, and surfactants; or by modification of the polyolefin, for example, by copolymerization of an alkene, such as ethylene, with comonomers such as maleic acid, acrylic acid, akali metal salts of these acids, or allyl alcohol, or by graft polymerization of polyolefins with vinyl acetate, acrylic acid, or the like.

Because of their lipophilic properties, the polyolefins are also suitable in the form of fibrids for absorbing hydrocarbons. Thus, for example, the polyethylene fibrids have been proposed for eliminating oil spills from confined bodies of water as well as for removing tar and condensate droplets from cigarette smoke. This absorption capacity for hydrocarbons can be advantageous for certain applications of the filtration process of this invention, for example, for filtering waste water containing oily materials; however, this property is by no means critical.

In another embodiment, which is advantageous for some applications of the process of the invention, particular heavy mineral fillers are incorporated into the polyolefin before the formation of fibrids from it. This has actually been done in the case of polyethylene. In this way the density of the fibrids can be adapted to the density of the medium to be filtered, i.e., they can be made to have practically the same density, or if desired, a somewhat higher density in order to avoid tendencies to float.

Furthermore, the high absorption capacity of polyolefin fibrids, which has been demonstrated in the case of polyethylene fibrids, contributes to their advantageous filter aid properties.

Examples of fibrids which are commercially available for producing paper from synthetic fiber, and which are suitable for use in the process of this invention include those sold under the trademarks PULPEX (Solvay), HOSTAPULP (Farbewerke Hoechst), CARIFIL (Shell) and similar products available from Mitsui (Japan) and Montedison (Italy). General information on fibrids, their properties, production, and use, can be found in the literature, for example, regarding polyethylene fibrids, in Angew, Chemie 1978, 90, 833–839.

In general, the filtration process of this invention can be carried out in a manner analagous to the conventional use of cellulose floc or paper pulp as a filter aid, for example, by preparing a suspension or pulp of the filter aid, and adding the pulp to the aqueous medium to be filtered. In this process it is often advantageous to form a precoated filter, using a suspension of the fibrids in clean water, on a relatively coarse filter medium, for example, a sieve, a perforated plate, a fabric, or a coarse fritted glass plate and subsequently to pass the aqueous medium to be filtered through the precoated filter, continuously adding more fibrids to the medium to be filtered if necessary. When fibrids are added continuously, the high absorption capacity of the fibrids for very fine solid particles yields especially advantageous results, since a given volume of the filter aid according to this invention can incorporate a significantly greater amount of very fine solid particles into the filter cake without it becoming quickly clogged than the known filter aids.

The filtration process of this invention is useful for all applications in the laboratory and in industrial operations in an analogous manner to the use of cellulose floc filter aid.

The polyolefin fibrids of this invention are, for the most part, resistant to most organic solvents and especially to aqueous acids and bases in the practically useful temperature range of 0°–100° C., and are especially resistant to hydrolysis. Because of this, they have a much greater range of applicability than the structurally very similar filter aids which are based on cellulose, and a far greater efficiency and economy than the known relatively resistant inorganic filter aids.

The filter aids of this invention can also be used in mixtures with each other, for example polyethylene/polypropylene fibrids, and also in mixtures with known filter aids.

The filtration process of this invention can also be carried out by dispersing a filter aid having a specific gravity less than 1 in a suspension to be filtered and allowing it to float to the top. The mass formed by the floating filter aid on the surface of the material to be filtered corresponds, in this case, to the filter cake, and contains the filter aid and at least a predominant portion of the finely divided suspended or emulsified impurities originally present in the suspension.

Thus the term "filter cake" includes both the mass of filter aid remaining on a filter medium together with the separated solids as well as a floating mass of filter aid with the filtered solids contained therein on the surface of an aqueous suspension.

Having generally described the invention, a more complete understanding can be obtained by reference to certain specific examples, which are provided herein for purposes of illustration only and are not intended to be limiting unless otherwise specified.

EXAMPLE

A hydrophilic thermoplastic polymer based on polyethylene (a commercial product manufactured by Solvay, "PE-PULPEX", Grade F 041/GP) was dispersed in excess water to form a pulp. This pulp was added to the filtering cycle of an industrial water purification apparatus, initially operating with clean water, in such amounts that a filter layer of 20 g (dry weight) of polyethylene fibrids per square meter was formed on the carrier surface of the precoat filter. Then waste water having a solids content of up to about 1 percent by weight was passed through the filter layer. Additional fibrid pulp was continuously added in an amount which (calculated on the fibrid portion) corresponded approximately to the proportion of impurities in the waste water. In this way the polyethylene fibrids could bind the soil particles even while they were in suspension before they reached the filter cake.

The filtering apparatus was operated until the permissible upper limit of the pressure drop across the filter was reached and then was shut off. The filter cake (polyethylene fibrids and impurities) which formed on the surface of the filter medium was peeled off the filter medium surface. The filter cake could then be discarded as such or burned after being dried.

Comparative tests using cellulose floc as a filter aid showed that the process of the invention permits a fourfold increase in the efficiency. When the polyethylene fibrids were used as a filter aid according to the invention, 2 parts by weight of impurities could be bound in the filter cake by one part by weight of the filter aid. When the cellulose floc was used as the filter aid, only 0.5 part by weight of impurities could be taken up by 1 part by weight of the cellulose. In this instance, the pressure drop is considerably greater through a filter cake of the same weight and a definite thickness made of cellulose fibers as compared with the pressure drop of a similarly formed filter cake made from the filter aid of this invention (polyethylene fibrids).

This comparatively lower pressure drop across the filter cake of this invention can probably be explained by the relatively greater swelling of cellulose in water. For this reason, it is preferable to use polyolefin fibrids which exhibit no or very little tendency to swell in water (for example, less than 5% by weight of water uptake at 20° C.). This consideration is especially important in the selection of a method for rendering the polyolefin fibrids hydrophilic.

It was also determined that the polyethylene fibrids used retained considerably finer particles—into the colloidal range—than, for example, other filtering aids, and they accomplished this with the same or lower pressure drop.

Having now fully described the invention, it will be apparent to one of ordinary skill in the art that many changes and modifications can be made thereto without departing from the spirit or scope of the invention as set forth herein.

What is claimed as new and intended to be secured by Letters Patent of the United States is:

1. A process of filtering waste water comprising passing said water through a filter medium wherein a filter aid comprising polyolefin fibrids which have been rendered hydrophilic is added to said waste water before it is passed through the filter medium, the fibrids having a mean CFL of from about 0.5 to 2.5 mm., and a specific surface area of from about 5 to 10 $m^2/g$.

2. The filtration process of claim 1, wherein said filter medium, before the waste water is passed therethrough, is coated with a filter aid comprising polyolefin fibrids which have been rendered hydrophilic.

3. The filtration process of claim 1, wherein said fibrids are selected from the group consisting of polyethylene fibrids, polypropylene fibrids, and fibrids prepared from mixtures of polyethylene and polypropylene.

4. The filtration process according to claim 1 or claim 3, wherein said polyolefin fibrids are added to said waste water in a proportion by weight equal to at least one half the proportion of the impurities in the waste water.

5. The filtration process according to claim 1 or claim 3, wherein said polyolefin fibrids have been rendered hydrophilic by treatment with a hydrophilizing agent or by modification of the polyolefin.

* * * * *